United States Patent Office 3,784,645
Patented Jan. 8, 1974

3,784,645
METHOD FOR TREATING NITROGEN-CONTAINING POLYMERIC DISPERSANTS
Harry Chafetz, Poughkeepsie, William P. Cullen, Fishkill, and Edward F. Miller, Beacon, N.Y., assignors to Texaco Inc., New York, N.Y.
No Drawing. Filed Nov. 12, 1971, Ser. No. 198,467
Int. Cl. C07c 87/20
U.S. Cl. 260—583 N  13 Claims

ABSTRACT OF THE DISCLOSURE

Method for treating nitrogen-containing polymeric dispersants for mineral lubricating oil compositions comprising admixing the dispersant with a particulate metal reactive with the unstable materials present in the dispersant, heating the mixture at a temperature in the range from about 200 to 400° C., separating a metal-containing layer, extracting the treated dispersant with a lower aliphatic alcohol and recovering a dispersant of improved thermal stability.

BACKGROUND OF THE INVENTION

Field of the invention

This invention is concerned with nitrogen-containing polymeric dispersants employed in lubricating oil compositions. Modern lubricating oil compositions for internal combustion engines contain a dispersant which functions to keep any impurities suspended in the lubricating oil so that they can be removed by the oil filter in the lubrication system.

In general, the dispersant is a nitrogen-containing polymeric material which has the ability to disperse and maintain in suspension any foreign insoluble material present in the lubricating oil.

The nitrogen-containing polymeric dispersants currently in use are highly effective against sludge and varnish formation under stop and go type driving conditions. The high temperature performance of these nitrogen-containing polymeric dispersants, however, is not satisfactory. In particular, many of the nitrogen-containing polymeric dispersants do not provide adequate protection against the formation of varnish at high temperatures, a deficiency which showed up when they were employed in a lubricating oil composition in diesel engine service. It has been postulated that this defect is due to the presence of thermally unstable compounds in the nitrogen-containing polymeric dispersant which at a high temperature cause or contribute to the formation of varnish in the engine.

DESCRIPTION OF THE PRIOR ART

No art is known which describes a method for treating nitrogen-containing polymeric dispersants for motor oils so as to improve their sludge and varnish resistant properties under high temperature engine operating conditions.

SUMMARY OF THE INVENTION

The method of the invention comprises treating a nitrogen-containing polymeric dispersant for a lubricating oil composition having heat unstable components by contacting the dispersant with a metal in a particulate form while heating the mixture at an effective temperature and for sufficient time to decompose said unstable components separating said metal-containing phase and extracting the treated product with a lower aliphatic alcohol.

More particularly, this method involves treating an oil-soluble nitrogen-containing polymeric lubricating oil dispersant, characterized by containing from about 0.5 to 6 percent nitrogen and by an average molecular weight ranging from about 500 to 50,000, by contacting the dispersant with a particulate metal which is reactive with the unstable varnish or lacquer promoting components of the dispersant and heating this mixture to a temperature generally in the range of 200 to 400° C. until substantially all of the thermally unstable components in the dispersant have decomposed and/or combined with or coated the metal, separating the metal by a suitable means, extracting additional decomposed unstable components by solvent extraction and thereafter recovering the treated nitrogen-containing polymeric dispersant.

The method of this invention is relatively simple to conduct. In practice, a mixture of a liquid nitrogen-containing polymeric dispersant described and a metal in a comminuted form is prepared. This mixture is heated in a suitable vessel to a temperature generally ranging from about 200 to 400° C., preferably from 250 to 300° C., desirably with agitation or stirring of the mixture in order to insure distribution of the heavy metal throughout the liquid dispersant. The mixture is maintained at an elevated reaction temperature until a substantial portion or all of the unstable components in the dispersant have decomposed or deposited on the metal. This will generally be evidenced by a loss of nitrogen from the dispersant and the nitrogen content of the dispersant can be monitored during the process as an indication of the completeness of the treatment.

The heat-treated dispersant of improved thermal stability and reduced varnish forming tendencies when employed in a lubricating oil is separated or recovered from the product mixture containing a metal phase by conventional separation means, such as by filtration. Additional decomposed unstable components are removed from the treated product by extracting the heat-treated dispersant with a lower aliphatic alcohol having from about 1 to 6 carbon atoms. Methanol, ethanol, isopropanol, butanol and mixtures thereof are particularly effective extraction solvents. The mechanism of the reaction is not fully understood, but it is postulated that the unstable components in the dispersant to some extent become bound to or react with the metal and/or decompose and are thereafter removed from the dispersant in the subsequent separation treatment.

Any comminuted metal is suitable for use in the instant process. The preferred metals for this process are steel, stainless steel, aluminum, iron, magnesium, lead and zinc which effectively react with the unstable components in the dispersant. Aluminum is particularly preferred being highly effective and economical to use. The metal can be employd in any convenient shape or size. It will be appreciated that the greater the surface area of the metal is exposed, the more efficient it will be in promoting the decomposition and removal of the unstable components in the dispersant. In general, the metal may be employed in any convenient particulate or comminuted form, i.e. in spheres, chips, strips or as a powder. There is no criticality to promote the decomposition of the unstable compounds in the dispersant.

The duration of time for effecting the decomposition reaction is not critical. It will be understood, however, that this time will be affected by the metal employed, its degree of fineness, the temperature and the amount of agitation employed.

A variety of nitrogen-containing polymeric dispersants can be benefitted by the reaction of this invention. In general, the nitrogen-containing polymeric dispersants are oil-soluble mixtures of compounds formed from the reaction of a high molecular weight polymeric material and a nitrogen-containing compound, such as an amine or a polyamine. The nitrogen-containing polymeric dispersant reaction product is characterized by containing from about 0.5 to about 6 weight percent of nitrogen in the polymer and having a molecular weight averaging from about 500 to about 50,000. The most effective and preferred nitrogen-containing polymeric dispersants for employment in the process of the invention contain from about 1 to 3 percent nitrogen and have an average molecular weight ranging from about 700 to about 3000.

N-polyamine-substituted-alkenyl succinimides represent a class of nitrogen-containing polymeric dispersants which can be benefitted by the process of the invention. These materials can be prepared by reacting an alkenyl succinic acid anhydride having the formula:

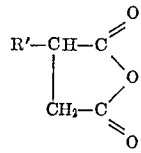

in which R' is a hydrocarbon radical having a molecular weight from about 400 to about 3000 with from one half to two molar amounts of a polyamine having the formula:

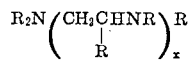

in which $x$ is an integer from 1 to 6 and R is hydrogen or a low molecular weight alkyl radical.

R' is the first formula above represents a hydrocarbon radical preferably derived from the olefin containing from 2 to 5 carbon atoms. Suitable olefins from which R' is derived are ethylene, propylene, 1-butene, isobutylene, 1-amylene, 2-amylene and the like. The R' radical generally has a molecular weight ranging from about 400 to 3000 corresponding to approximately 30 to 200 carbon atoms, with a preferred molecular weight being from about 800 to 1500.

R in the polyamine represents hydrogen or a low molecular weight alkyl radical having from 1 to 3 carbon atoms, x is an integer from 1 to about 6 and preferably from 2 to 5. Suitable polyamines or polyalkylene polyamines for preparing the reaction product are ethylene diamine, propylene diamine, butylene diamine, diethylene triamine, triethylene tetramine, tetraethylene pentamine, pentaethylene hexamine, dipropylene triamine, tripropylen tetramine, dimethylaminoethylamine, dimethylaminopropylamine and diethylaminopropylamine.

From one-half to two moles of the polyamine are reacted with one mole of the alkenyl succinic acid anhydride to form the reaction product. It is preferred to react approximately one mole of the alkenyl succinic acid anhydride with one mole of the polyamine. The reaction is normally effected at a temperature up to about 200° C. The preparation of this type reaction product is described in U.S. 3,131,150 and U.S. 3,172,892 and the disclosures of these patents are incorporated in the present application.

Another type of nitrogen-containing polymeric dispersant which can be improved by the present process are the oil-soluble polyalkylene polyamine derived dispersants. These nitrogenous dispersants can conveniently be prepared by reacting a halogenated polyolefin with a polyalkylene polyamine. In general, a halogen-containing polymer containing from 25 to 500 carbon atoms, such as the chlorinated polymer of propylene, ethylene-propylene, ethylene, butylene, isobutylene and the like, is reacted with a polyalkylene polyamine such as ethylenediamine, 1,3-propanediamine, 1,6-hexanediamine, tetraethylenepentamine, pentaethylenehexamine, iminobispropylamine, N-aminoethylpiperazine and polyalkylene polyamines in general having a molecular weight from about 60 to 300. The resulting product are oil-soluble nitrogen-containing dispersants containing from about 0.5 to 6 percent nitrogen and having a molecular weight ranging from 1,200 to substantially above 50,000. The materials are more fully described in U.S. 3,275,554, 3,454,555 and 3,565,804 wherein their use as lube oil additives is described. The disclosures of these references are incorporated in the present application.

The high temperature performance of nitrogen-containing polymeric dispersants derived from sulfurized polymers can be greatly improved by this method. These materials are prepared by reacting polymers having a molecular weight range of about 400 to 50,000 derived preferably from $C_2$–$C_5$ olefins, with sulfur at an elevated temperature in the range of 150 to 300° C. and subsequent reaction with amines. These amines include polyalkylenepolyamines of the general formula:

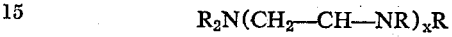

where R is a hydrogen or a low molecular weight alkyl radical having from 1 to 4 carbon atoms and $x$ is an integer from 1 to 6. Other suitable amines are 1,3-propanediamine, 1,4-butanediamine, 1,6-hexanediamine and the like as described in the sulphur-free materials referred to above. The sulphur-containing polymers will generally contain from about 0.5 to 5 percent sulphur. Polymers of the type disclosed in U.S. 3,459,664 containing trithione polyamine reaction product are improved by the instant process.

Example I 4,200 grams (3.0 moles) sulphurized polyisobutylene having the molecular weight of about 1,200 and containing 7.6% sulphur and 2,646 grams (14.0 moles) tetraethylene pentamine were heated at 200° C. for 6 hours. The reaction mixture was diluted with heptane, extracted with a methyl alcohol-isopropyl alcohol mixture and stripped under vacuum to 100° C. The untreated reaction product amounted to 3,800 grams and had the following analysis:

Percent nitrogen _____ 1.4
Percent sulphur _____ 3.8
Total base number _____ 30.9

Aluminum pellets were added to a portion of the above untreated reaction product. This mixture was then heated at 250° C. for 20 hours with mechanical stirring and a nitrogen purge. This reaction mixture was cooled, diluted with 30% mineral oil and filtered. The filtrate was diluted with heptane, extracted with methyl alcohol-isopropyl alcohol mixture and stripped to 100° C. under vacuum. Analysis of the reaction product corrected for the oil present was as follows:

Percent nitrogen _____ 1.1
Percent sulphur _____ 3.8
Total base number _____ 27.2

The effectiveness of the method of the invention was determined by employing both the heat-treated and untreated nitrogen-containing polymeric dispersants described above in a conventional crankcase lubricating oil composition at a concentration to provide a nitrogen content of about 0.07 percent and running these crankcase oils in a diesel engine test. Specifically, the lubricating oil compositions were employed in the Caterpillar 1–H diesel engine test. The crankcase lubricant in this test encounters relatively high engine temperatures which causes the formation of substantial amounts of varnish deposits on the piston of the engine. To pass the Caterpillar 1–H engine test, the lubricant must be effective against the formation of varnish on the piston skirts during the entire engine test period of 480 hours. Any shorter time to varnish or lacquer formation below the second groove is a failure of the test.

Oil A is a conventional cranckcase lubricant containing the untreated dispersant of Example I. Oil B is the same conventional crankcase lubricant containing the heat-treated dispersant of Example I. The results obtained from the Caterpillar 1–H engine test are set forth in Table I below. The data shows the percentage of fill in the top groove (TGF) and the percentages of varnish covering in the first groove 1–G, first land 1–L, second groove 2–G and the skirt area below the second groove.

stable components which comprises admixing a comminuted metal with said dispersant to form a mixture, heating said mixture at a temperature in the range of 200 to 400° C. to react and decompose said thermally unstable components and form a coating on said metal,

TABLE I

|  | Oil A |  | Oil B |
|---|---|---|---|
| Test duration (hrs.) | 120 [1] | 120 | 480 |
| Percent TGF | 1 | 0 | 2. |
| 1-G, percent coverage | 68 | 56 | 100. |
| 1-L, percent coverage | 84 | 8 | 100. |
| 2-G, percent coverage | 41 | Clean below first land | 15. |
| Piston skirt | Varnish below second groove |  | Clean below second land. |

[1] Shut down.

It can be seen from the above Caterpillar 1–H Engine Test data that Oil B containing the heat-treated dispersant is substantially more effective than Oil A in preventing varnish deposits in the lower ring areas.

Example II

To 4,000 grams of chlorinated polybutene having a molecular weight of about 1300 and containing 2.76 percent chlorine, was added 721 grams (3.1 moles) of pentaethylenehexamine and 159 grams (1.5 moles) of sodium carbonate. The mixture was then heated at 200 to 205° C. for 5 hours under a nitrogen atmosphere, diluted with 2000 grams of diluent, oil, filtered and cooled. The crude product was diluted with hexane and extracted three times with a methanol-isopropyl alcohol mixture. The hexane layer was stripped under vacuum at 93° C. yielding a product containing 1.4% N and 0.17% Cl.

3,500 grams of this additive were mixed with 200 grams of aluminum pellets and heated at 250° C. for 10 hours under a nitrogen atmosphere. The mixture was then cooled, diluted with hexane and filtered. The filtrate was extracted with a methyl alcohol-isopropyl alcohol mixture. The hexane layer was stripped under aspirator vacuum at 93° C. Analysis of the treated dispersant gave 1.1% N and 0.13% Cl.

The additives prepared above were tested in the CLR L–38 test. This test is a measure of the oxidation and copper-lead bearing corrosion characteristics of lubricating oils. The lubricating oil composition employed was a fully formulated conventional lubricant containing an alkaline detergent, a zinc dithiophosphate, viscosity index improved and a pour depressant in a paraffinic mineral oil.

The treated dispersant was added to the fully formulated base oils in an amount to give 0.071% nitrogen in the finished oil, designated Oil C. The untreated dispersant was added in an amount to give 0.084% nitrogen in the test oil, designated Oil D.

The two oils were tested in the L–38 Test and the bearing weight loss (BWL) measured as shown below.

TABLE II

L–38 test

| Oil: | Mg. BWL |
|---|---|
| Oil D (with untreated dispersant) | 69.3 |
| Oil C (with treated dispersant) | 17.5 |

The data in Table II above show that Oil C with the heat-treated dispersant was greatly superior to Oil D containing the untreated dispersant.

We claim:

1. A method for treating an oil-soluble nitrogen-containing polymeric dispersant containing thermally unstable components which comprises admixing a comminuted metal with said dispersant to form a mixture, heating said mixture at a temperature in the range of 200 to 400° C. to react and decompose said thermally unstable components and form a coating on said metal, separating said control metal, extracting additional decomposed thermally unstable components by extraction with an aliphatic alcohol having from 1 to 6 carbon atoms and recovering a dispersant substantially free of thermally unstable components.

2. A method according to claim 1 in which said metal is selected from the group consisting of aluminium, iron, steel, stainless steel, magnesium, lead and zinc.

3. A method according to claim 1 in which said metal is aluminium.

4. A method according to claim 1 in which said metal is steel.

5. A metal according to claim 1 in which said metal is zinc.

6. A method according to claim 1 in which said metal is magnesium.

7. A method according to claim 1 in which the extraction solvent for the decomposed unstable components is methyl alcohol.

8. A method according to claim 1 in which the extraction solvent for the decomposed unstable components is ethyl alcohol.

9. A method according to claim 1 in which the extraction solvent for the decomposed unstable components is a mixture of methanol and isopropanol.

10. A method according to claim 1 in which said treating is conducted at a temperature in the range from about 250 to 300° C.

11. A method according to claim 1 in which said nitrogen-containing polymeric dispersant is characterized by containing from about 0.5 to 6 percent nitrogen and has an average molecular weight ranging from about 500 to 50,000.

12. A method according to claim 1 in which said nitrogen-containing polymeric dispersant is characterized by containing from about 1 to 3 percent nitrogen and has an average molecular weight ranging from about 700 to 3000.

13. A method according to claim 1 in which said nitrogen-containing polymeric dispersant has an average molecular weight ranging from about 800 to 1500.

References Cited

UNITED STATES PATENTS 2,495,478    1/1950    Redman _____ 260—132

LEWIS GOTTS, Primary Examiner

D. R. PHILLIPS, Assistant Examiner

U.S. Cl. X.R.

252—34.7, 47, 50; 260—122, 133, 135, 239, 326.5, 583 P